US009010368B2

(12) United States Patent  
Wolter

(10) Patent No.: US 9,010,368 B2
(45) Date of Patent: Apr. 21, 2015

(54) GAS MODULATION AND TEMPERATURE CONTROL VALVE

(75) Inventor: Gerry C. Wolter, Cincinnati, OH (US)

(73) Assignee: Precision Temp, Inc., Cincinnati, OH (US)

( * ) Notice: Subject to any disclaimer, the term of this patent is extended or adjusted under 35 U.S.C. 154(b) by 123 days.

(21) Appl. No.: 13/227,073

(22) Filed: Sep. 7, 2011

(65) Prior Publication Data

US 2012/0060951 A1 Mar. 15, 2012

Related U.S. Application Data

(60) Provisional application No. 61/380,603, filed on Sep. 7, 2010, provisional application No. 61/416,050, filed on Nov. 22, 2010.

(51) Int. Cl.
*F16K 31/06* (2006.01)
*F16K 11/10* (2006.01)
*F23N 1/00* (2006.01)
*F23N 1/08* (2006.01)

(52) U.S. Cl.
CPC .............. *F16K 11/105* (2013.01); *F23N 1/007* (2013.01); *F23N 1/087* (2013.01); *F23N 2035/22* (2013.01); *F23N 2035/24* (2013.01)

(58) Field of Classification Search
USPC ............. 137/2, 9, 12, 87.03, 94, 98, 595, 637
See application file for complete search history.

(56) References Cited

U.S. PATENT DOCUMENTS

| | | | | | |
|---|---|---|---|---|---|
| 2,900,999 | A | * | 8/1959 | Courtot | 137/516.25 |
| 3,806,026 | A | * | 4/1974 | Trotter et al. | 236/23 |
| 3,877,478 | A | * | 4/1975 | Longworth | 137/94 |
| 3,917,162 | A | * | 11/1975 | Trotter et al. | 236/23 |
| 3,957,244 | A | | 5/1976 | Chauvigne | |
| 4,164,959 | A | * | 8/1979 | Wurzburger et al. | 137/553 |
| 4,304,249 | A | * | 12/1981 | White | 137/94 |
| 4,535,797 | A | * | 8/1985 | Rosaen | 137/87.03 |
| 4,655,239 | A | * | 4/1987 | Kato | 137/94 |
| 6,283,153 | B1 | * | 9/2001 | Brisco et al. | 137/625.47 |
| 6,564,828 | B1 | * | 5/2003 | Ishida | 137/515.5 |
| 6,648,235 | B2 | | 11/2003 | Chan | |
| 7,864,062 | B2 | * | 1/2011 | Cook et al. | 340/603 |
| 2009/0283157 | A1 | * | 11/2009 | Hogan | 137/542 |
| 2010/0043896 | A1 | * | 2/2010 | Shock et al. | 137/613 |

FOREIGN PATENT DOCUMENTS

| | | |
|---|---|---|
| CN | 1128855 A | 8/1996 |
| CN | 1372116 A | 10/2002 |

OTHER PUBLICATIONS

Chinese Office Action dated Nov. 3, 2014 for Application No. CN 201180053385.2.

* cited by examiner

*Primary Examiner* — Craig Schneider
*Assistant Examiner* — Reinaldo Sanchez-Medina
(74) *Attorney, Agent, or Firm* — Frost Brown Todd LLC

(57) ABSTRACT

An apparatus comprises a body, a first poppet, and a second poppet. The body comprises a first fluid channel and a second fluid channel. The first fluid channel and the second fluid channel are operable to be fluidly isolated from each other. The first poppet is positioned in the first fluid channel, and the first poppet is operable to be moveable within the first fluid channel. The second poppet is positioned within the second fluid channel, and the second poppet is operable to be moveable within the second fluid channel. The first poppet and the second poppet are operable to be mechanically coupled together such that movement of the first poppet within the first channel is operable to cause sympathetic movement of the second poppet within the second fluid channel.

10 Claims, 5 Drawing Sheets

GAS MODULATION AND TEMPERATURE CONTROL VALVE

PRIORITY

This application claims priority to U.S. Provisional Application Ser. No. 61/380,603, filed Sep. 7, 2010, entitled "Gas Modulating/Temperature Control Valve," and U.S. Provisional Application Ser. No. 61/416,050, filed Nov. 22, 2010, entitled "Gas Modulating/Temperature Control Valve," the disclosures of which are incorporated by reference herein.

BACKGROUND

Water heaters are used in many situations including, but not limited to, the RV and marine industry. In the past, previous ways of controlling gas modulation and temperature have been used. One such previous method includes a pressure diaphragm in the water stream of the water heater that mechanically modulates the gas valve through changes in water pressure. However, the pressure diaphragm can be very sensitive to variations in line pressure of water and can be unreliable in consistent temperature control, which can be a problem in mobile applications having various water pressure sources. Additionally, the pressure diaphragm often includes complex assemblies that increase the risk of leaking as well as adds to potential maintenance issues and the cost of tooling.

In other scenarios, electronic gas modulation has been used, which may use electronic sensors and thermistors in addition to microprocessors to monitor incoming water temperature as well as to process information and electrically adjust the gas valve. Due to the types of parts involved in electronic gas modulation, electronic gas modulation may be very expensive and difficult to service due to its complexity.

While a variety of gas modulation and temperature control valves have been made and used, it is believed that no one prior to the inventor(s) has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which.

Figure 1:
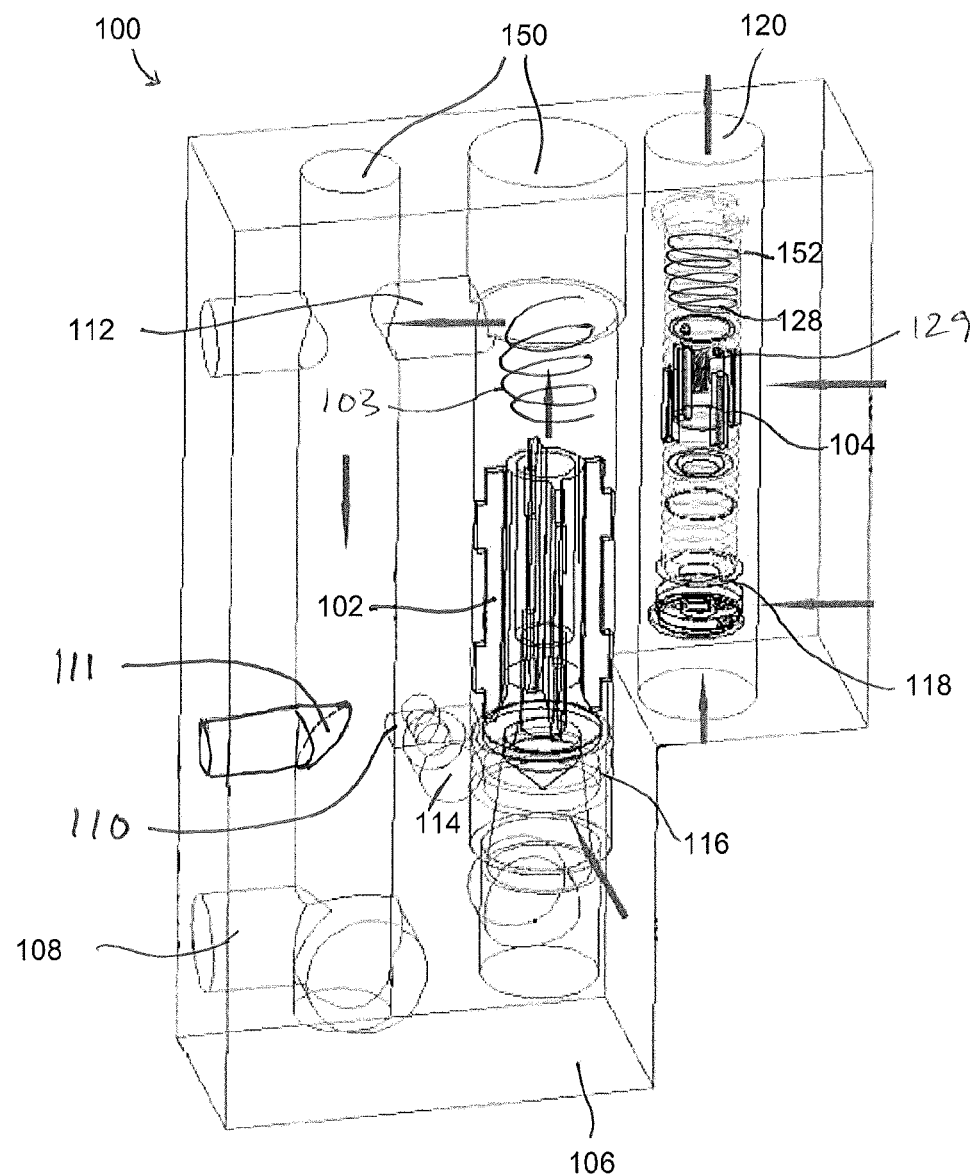
FIG. 1 depicts a perspective view of gas modulating and temperature control valve.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Gas Modulating and Temperature Control Valve

Gas modulating and temperature control valve (100) may be used in communication with a hot water heater such that gas modulating and temperature control valve (100) is operable to control the flow of gas to a hot water heater based on increasing and decreasing water flow as will be described in further detail below. In one exemplary operation of gas modulating and temperature control valve (100), as water flow increases, gas modulating and temperature control valve (100) effectuates a higher flow of gas to heat water. As water flow decreases, gas modulating and temperature control valve (100) effectuates a lower flow of gas to heat water.

Figure 4:
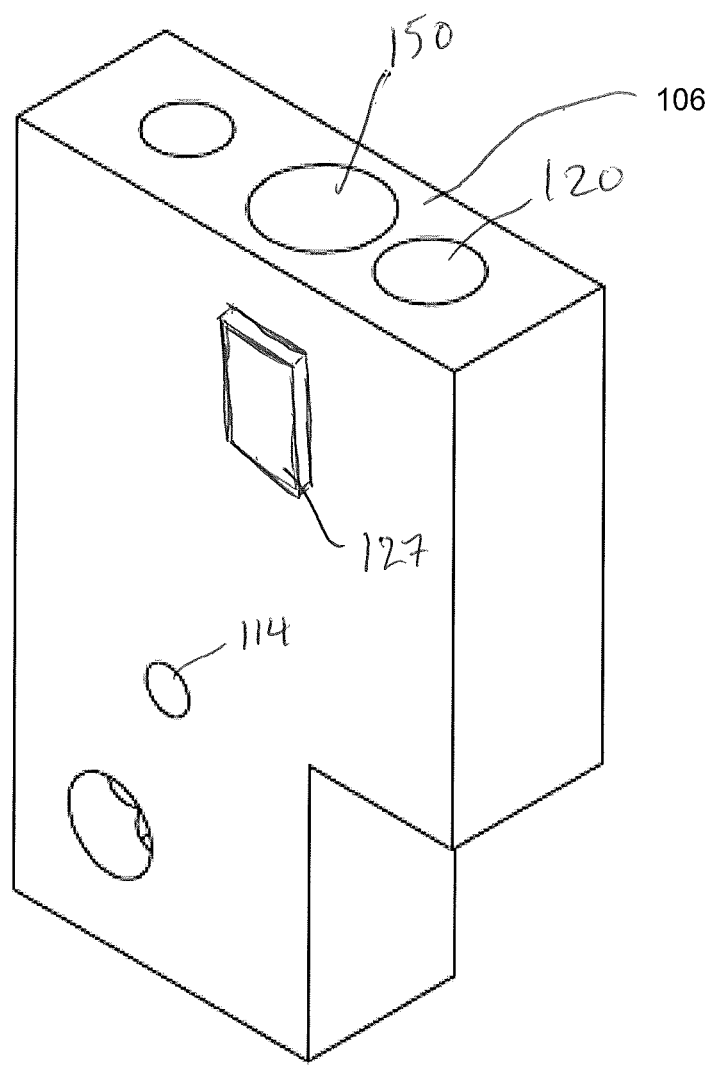
FIG. 4 depicts a perspective view of the body of the gas modulating and temperature control valve of FIG. 1.
Figure 5:
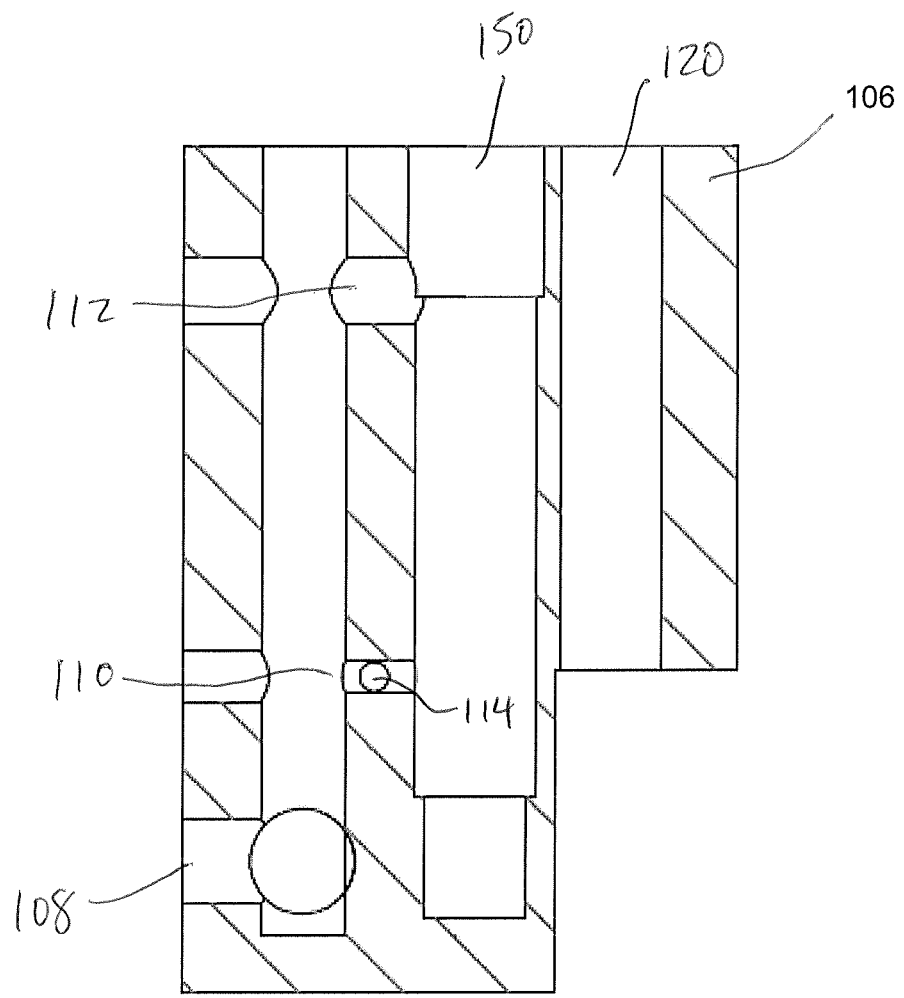
FIG. 5 depicts a cross sectional view of the body of FIG. 4.

FIGS. 1 and 4-5 depicts exemplary gas modulating and temperature control valve (100) comprising a body (106). Body (160) has a block-like, upside-down L-shape. However, any suitable shape for body (106) may be used as would be apparent to one of ordinary skill in the art in view of the teachings herein. Body (106) of gas modulating and temperature control valve (100) may be manufactured of low cost materials such as PVC plastic, which is operable to act as a non-magnetic conduit for cold water flow, or any other suitable materials as will be apparent to one of ordinary skill in the art in view of the teachings herein.

Body (106) comprises a water channel (150) and a gas channel (152) extending through body (106). A water poppet (102) is positioned within the water channel (150), which rests upon a water poppet orifice or seat (116). A gas poppet (104) is positioned within gas channel (152) and rests upon gas poppet orifice or seat (118). Water channel (150) is in communication with a heat exchanger port (108) and a leak valve (114). Bypass valve (114) is in communication with a leak port (110).

Gas modulating and temperature control valve (100) is operable to mechanically respond to water flow through water channel (150). Additionally gas modulating and temperature control valve (100) communicates with gas channel (152) by a magnetic relationship between water valve poppet (102) and gas valve poppet (104) which modulates gas flow through gas channel (152), thereby controlling output water temperature through a wide range of water flow rates. In general, as water flow increases, gas flow increases, and water temperature increases.

In some exemplary versions, gas modulating and temperature control valve (100) is operable to act as: a flow switch to effect the ignition of an appliance burner, a gas modulation for temperature control, a temperature adjustment bypass valve, a mounting point for pressure relief valve (PRV), and a water and gas connection point. It will be understood that other suitable functionalities of temperature control valve (100) may be realized as would be apparent to one of ordinary skill in the art in view of the teachings herein.

Figure 2:
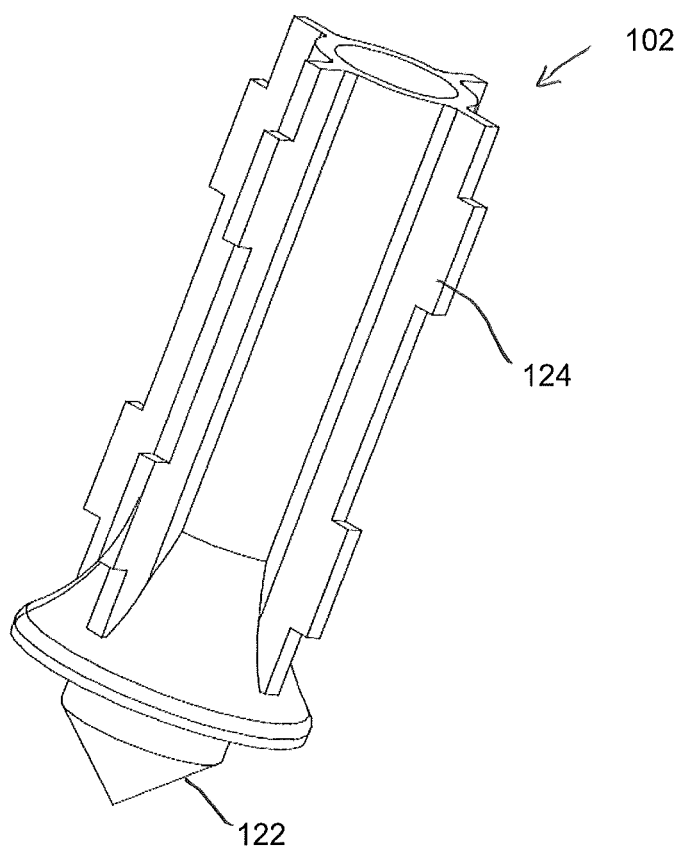
FIG. 2 depicts a perspective view of a water poppet of the gas modulating and temperature control valve of FIG. 1.
Figure 3:
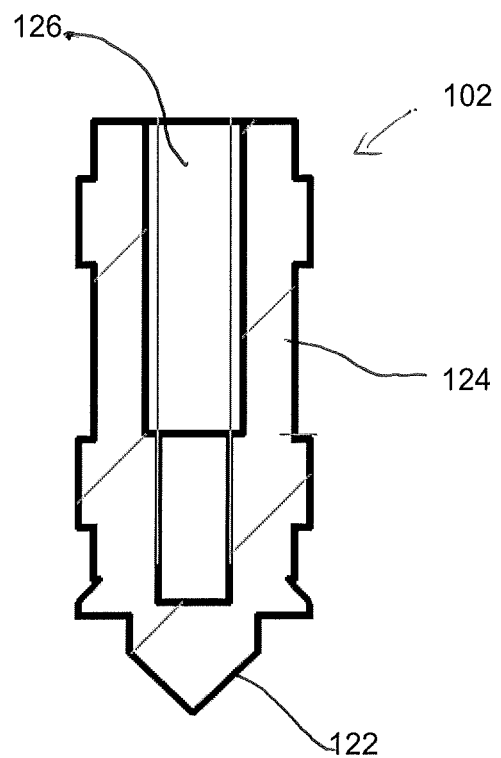
FIG. 3 depicts a cross sectional view of the water poppet of FIG. 2.

FIGS. 2-3 show water poppet (102). Water poppet (102) has a cylindrical shape terminating in a conical tip (122). While the present example comprises a conical tip (122), it will be appreciated that other tip (122) shapes may be used. For example, tip (122) may have a flat shape, a rounded shape, or any other suitable shape as would be apparent to one of ordinary skill in the art in view of the teachings herein. A plurality of notched fins (124) extend outwardly from water poppet (102). In the exemplary version, water poppet (102) comprises four fins (124), but any suitable number of fins (124) may be used as would be apparent to one of ordinary skill in the art. Fins (124) are operable to stabilize water poppet (102) within water channel (150). It will be appreciated that fins (124) are also operable to provide clearance such that water can travel around water poppet (102) as water travels through water channel (150).

FIG. 3 depicts a cross sectional view of water poppet (102) showing magnet (126) positioned within water poppet (102). It will be appreciated that magnet (126) is positioned extending through the center of water poppet (102). However, other configurations for magnet (126) may be used as would be apparent to one of ordinary skill in the art in view of the teachings herein. Magnet (126) is operable to magnetically couple with gas poppet (104) such that movement of magnet (126) with water poppet (102) is operable to cause movement in gas poppet (104). Furthermore, while the present example uses magnet (126) to couple water poppet (102) and gas poppet (104), it will be appreciated that any suitable means of coupling water poppet (102) and gas poppet (104) may be used as would be apparent to one of ordinary skill in the art in view of the teachings herein.

Returning to FIG. 1, gas poppet (104) and gas poppet seat (118) form a variable gas orifice, which increases gas flow as gas poppet (104) is vertically moved from gas poppet seat (118). A bypass gas flow is maintained by a minimum clearance around gas poppet (104) when gas poppet (104) is at a full rest position in order to maintain ignition during very low water flow rates when minimum heat input is required. The clearance around gas poppet (104) may also be used to determine the minimum gas flow rate. The portion of body (106) surrounding gas poppet (104) may be constructed of a non-magnetic material such as, for example, brass which can safely act as a gas conduit. It will be appreciated that other suitable materials may be used for body (106) surrounding gas poppet (104) as would be apparent to one of ordinary skill in the art in view of the teachings herein. In other exemplary versions, a pipe may extend through body (106), thereby defining gas channel (152) where the pipe may be constructed of any suitable material, such as, for example, brass, or any other suitable material as would be apparent to one of ordinary skill in the art in view of the teachings herein.

Both gas channel (152) and water channel (150) are oriented generally in a vertical position with both gas and water, respectively, being flowed generally from bottom to top. As a result, gravity works in conjunction with springs (128) to return gas poppet (104) to the low flow condition when water flow is reduced.

Gas modulating and temperature control valve (100) is operable to act generally as a flow switch (turning a burner on and off and utilizing an electronic direct spark or hot surface ignition device), which may fully mechanically modulate the gas input to the burner in order to maintain a given temperature over a wide range of water flow rates. The gas modulation range may range approximately from 12,000-55,000 BTUs input to a burner via burner port (120), but can be designed to accommodate suitable higher or lower gas flow rates as will be apparent to one of ordinary skill in the art in view of the teachings herein. This may be accomplished by variations in water poppet (102) clearances, tapered seat tolerances and combined with modified spring (103) tension and length. An approximately five to one modulation range may be attained, but other suitable modulation ratio ranges may be used as would be apparent to one of ordinary skill in the art in view of the teachings herein.

Body (106) is constructed such that gas channel (152) is in close proximity to water channel (150). Water enters the bottom of water channel (150) near water poppet seat (116) where water poppet (102) is situated. Water flows up water channel (150) where it meets resistance with water poppet (102). It will be appreciated that water poppet (102) resistance may be modified by factors such as the amount of water poppet (102) clearance in relation to the sides of water channel (105), the concentration of the water stream from water poppet seat (116) and calibrated spring (103) situated on top of water poppet (102) operable to drive water poppet (102) downward toward water poppet seat (116). When the water flow is initiated, the downward resistance of water poppet (102) is overcome in direct proportion to the velocity of the water flow upward. Consequently, water poppet (102) begins to rise at a rate generally in proportion to upward water flow.

As water poppet (102) rises, magnet (126) sealed within water poppet (102) aligns with reed switch (127), which is mounted in close proximity to the center water channel (150). Reed switch (127) closes to effectuate the ignition process of, for example, a heating appliance. The water flow rate used to effectuate the ignition process may be adjusted by varying the vertical orientation and/or position of reed switch (127) in relation to water channel (150). It will be appreciated that the higher reed switch (127) is oriented, the higher the water flow rate that will be required to effect ignition.

When the water flow increases, water poppet (102) continues to rise and begins to magnetically communicate with magnets (129) contained in gas poppet (104) in gas channel (152). Gas poppet (104) will rise away from gas poppet seat (118) to increase the gas pressure as the water flow increases. More gas may be applied to the burner to compensate for the increase in water flow, thereby maintaining a relatively continuous output water temperature through a broad range of water flow variations. As the water flow is reduced, water poppet (102) returns to its lower, at rest position, by gravity and spring (103). Gas poppet (104) reduces gas flow and reed switch (127) opens when flow is stopped.

Bypass valve (114) is operable to adjust output water temperature by bleeding a portion of the incoming water directly to a heat exchanger of an appliance connected to gas modulating and temperature control valve (100), thereby bypassing water poppet (102). It will be appreciated that bypass valve (114) allows the delivery of the same water volume, while reducing the upward throw of water poppet (102) and gas poppet (104), thereby reducing gas flow and output temperature. Bypass valve (114) comprises a small bleeder orifice at the head of water poppet seat (116), which allows for lower water flows to activate reed switch (127) control by lifting water poppet (102) just enough to align with reed switch (127) before the water is bled off through heat exchanger port (108). Water may be diverted within gas modulating and temperature control valve (100) in a downward direction by diverter face (111). Diverter face (111) enhances the redirection of the water such that some suitable amount of bypass is attained through the complete range of water flow rates. In the exemplary version, diverter face (111) is shaped as an angled protrusion extending into a portion of water channel (150) running parallel to the portion of water channel (150) where water poppet (102) is positioned, which is in fluid communication with crossover channel (112). In other exemplary versions, diverter face (111) may have any suitable shape as would be apparent to one of ordinary skill in the art in view of the teachings herein.

Magnets (126) in water poppet (102) are arranged so as to attract the magnets (129) in gas poppet (104). In some other exemplary versions, gas modulating and temperature control valve (100) may utilize repelling magnets (126, 129) rather than attracting magnets (126, 129), which may be used with a physically longer assembly, but other suitable variations will be apparent to one of ordinary skill in the art in view of the teachings herein.

In some exemplary versions, the outer edges of water poppet (102) may be notched in opposing directions to produce poppet agitation as the water passes by, which may allow for more precise poppet movement.

II. Exemplary Operation of Gas Modulating and Temperature Control Valve

In one merely exemplary operation of gas modulation and temperature control valve (100), cold water enters body (106) and is concentrated on water poppet (102) through water poppet seat (116). Tip (122) seated in water poppet seat (116) is lifted off of water poppet seat (116). Magnets (126) in water poppet (102) align with reed switch (127) in the back of body (106), and closes contacts to energize a relay to a power ignition board (not shown) which starts gas flowing and effects ignition.

Water poppet (102) movement upward is operable to be varied with the rate of water flow through water channel (150), which may be increased or decreased directly by the user. As water poppet (102) lifts, magnets (126) in shaft of water poppet (102) interact with magnets (129) in shaft of gas poppet (104) and lift gas poppet (104) off of gas poppet seat (118).

When water stops flowing, water poppet (102) returns to water poppet seat (116) by gravity and spring (103) seated on top of water poppet (102). Returning water poppet (102) to water poppet seat (116) opens contact in reed switch (127) and allows gas poppet (104) to return to a bypass position resting on gas poppet seat (118).

Bypass valve (114) may be used to adjust output water temperature by bleeding a portion of the incoming water directly to a heat exchanger, bypassing water poppet (102). This bypass allows the delivery of the same water volume, but reduces the upward throw of water poppet (102), thereby reducing gas flow and consequently output temperature. Vertical adjustment of body (106) in relation to water valve is operable to act as a calibration between gas modulating and temperature control valve (100) to optimize the high burn and bypass burn positions.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:

1. An apparatus comprising:
   (a) a body comprising a first fluid channel and a second fluid channel, wherein the first fluid channel and the second fluid channel are configured to be fluidly isolated from each other;
   (b) a first poppet positioned within the first fluid channel, wherein the first poppet is operable to be moveable within the first fluid channel; and
   (c) a second poppet positioned within the second fluid channel, wherein the second poppet is operable to be moveable within the second fluid channel, wherein the first poppet and the second poppet are configured to magnetically attract each other such that movement of the first poppet within the first fluid channel is operable to cause sympathetic movement of the second poppet within the second fluid channel.

2. The apparatus of claim 1, further comprising a bypass valve in communication with the first fluid channel, wherein the bypass valve is configured such that when open, a portion of the fluid flows through the bypass valve thereby bypassing the first poppet in the first fluid channel.

3. The apparatus of claim 1, wherein the first poppet comprises a magnet configured to magnetically couple with the second poppet.

4. The apparatus of claim 1, wherein the first fluid channel is operable to receive water.

5. The apparatus of claim 1, wherein the second fluid channel is operable to receive a gas.

6. The apparatus of claim 1, further comprising a spring positioned within the first fluid channel, wherein the spring is configured to apply a downward force on the first poppet.

7. The apparatus of claim 1, wherein the first poppet comprises a plurality of fins extending outward from the first poppet.

8. The apparatus of claim 1, wherein the first poppet is seated within a poppet seat.

9. The apparatus of claim 1, wherein the first poppet comprises a conical tip.

10. The apparatus of claim 1, further comprising a reed switch in communication with the body, wherein the reed switch is configured to trigger an ignition process.

* * * * *